(12) United States Patent
Kitayama et al.

(10) Patent No.: US 9,109,642 B2
(45) Date of Patent: Aug. 18, 2015

(54) ROTATION TRANSMISSION DEVICE

(71) Applicants: Naotsugu Kitayama, Shizuoka (JP); Koji Akiyoshi, Shizuoka (JP); Koji Sato, Shizuoka (JP)

(72) Inventors: Naotsugu Kitayama, Shizuoka (JP); Koji Akiyoshi, Shizuoka (JP); Koji Sato, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/343,880

(22) PCT Filed: Sep. 21, 2012

(86) PCT No.: PCT/JP2012/074173
§ 371 (c)(1),
(2) Date: Mar. 10, 2014

(87) PCT Pub. No.: WO2013/047351
PCT Pub. Date: Apr. 4, 2013

(65) Prior Publication Data
US 2014/0216882 A1    Aug. 7, 2014

(30) Foreign Application Priority Data

Sep. 26, 2011   (JP) ................. 2011-209238
Sep. 19, 2012   (JP) ................. 2012-205387

(51) Int. Cl.
*F16D 27/08*   (2006.01)
*F16D 21/00*   (2006.01)
(Continued)

(52) U.S. Cl.
CPC .............. *F16D 21/00* (2013.01); *F16D 27/112* (2013.01); *F16D 28/00* (2013.01); *F16D 41/08* (2013.01); *F16D 2023/123* (2013.01)

(58) Field of Classification Search
CPC ....... F16D 21/00; F16D 27/112; F16D 41/08; F16D 28/00; F16D 2023/123
USPC ........ 192/48.2, 38, 66.1, 35, 48.3, 48.7, 84.8, 192/110 B, 113.5
See application file for complete search history.

(56) References Cited

U.S. PATENT DOCUMENTS 4,030,581 A * 6/1977 Giometti ......................... 192/16
6,041,879 A * 3/2000 Itoh et al. ...................... 180/247
(Continued)

FOREIGN PATENT DOCUMENTS

| JP | 63-160064 | 10/1988 |
| JP | 63-178629 | 11/1988 |

(Continued)

OTHER PUBLICATIONS

International Search Report issued Dec. 25, 2012 in International (PCT) Application No. PCT/JP2012/074173.
(Continued)

*Primary Examiner* — David J Hlavka
(74) *Attorney, Agent, or Firm* — Wenderoth, Lind & Ponack, L.L.P.

(57) ABSTRACT

A rotation transmission device includes a two-way clutch and an electromagnetic clutch for engaging and disengaging the two-way clutch and which can be easily assembled without the need for a shim to prevent movements of the clutches. The two-way clutch (10) and the electromagnetic clutch (50) are mounted in a housing (3) including at one end a positioning arrangement (5). The two-way clutch (10) and the electromagnetic clutch (5) are biased by an elastic member (7) supported by the positioning arrangement (5) toward an anti-separation ring (8) provided on the inner periphery of the housing (3) at the other end thereof, and are thus prevented from moving.

7 Claims, 8 Drawing Sheets

(51) Int. Cl.
*F16D 28/00* (2006.01)
*F16D 41/08* (2006.01)
*F16D 27/112* (2006.01)
*F16D 23/12* (2006.01)

(56) References Cited

U.S. PATENT DOCUMENTS

| | | | |
|---|---|---|---|
| 6,244,403 B1* | 6/2001 | Ito et al. | 192/35 |
| 6,257,386 B1* | 7/2001 | Saito et al. | 192/48.2 |
| 7,086,513 B2* | 8/2006 | Bunko | 192/35 |
| 7,350,632 B2* | 4/2008 | Houtman et al. | 192/35 |
| 7,419,039 B2* | 9/2008 | Yasui et al. | 192/35 |
| 7,448,464 B2* | 11/2008 | Yamasaki et al. | 180/402 |
| 8,272,487 B2* | 9/2012 | Sato | 192/35 |
| 2002/0170795 A1* | 11/2002 | Yasui et al. | 192/35 |
| 2006/0180424 A1 | 8/2006 | Sato et al. | |
| 2007/0151795 A1 | 7/2007 | Chino et al. | |
| 2010/0314212 A1 | 12/2010 | Akiyoshi et al. | |
| 2011/0061983 A1 | 3/2011 | Sato et al. | |

FOREIGN PATENT DOCUMENTS

| | | |
|---|---|---|
| JP | 2002-345206 | 11/2002 |
| JP | 2003-056599 | 2/2003 |
| JP | 2006-226349 | 8/2006 |
| JP | 2007-153003 | 6/2007 |
| JP | 2009-156283 | 7/2009 |
| JP | 2009-293679 | 12/2009 |

OTHER PUBLICATIONS

Written Opinion of the International Searching Authority issued Dec. 25, 2012 (with English translation) in International (PCT) Application No. PCT/JP2012/074173.

* cited by examiner

ROTATION TRANSMISSION DEVICE

TECHNICAL FIELD

This invention relates to a rotation transmission device which can selectively transmit rotation of one member to another member.

BACKGROUND ART

One known rotation transmission device which can selectively transmit rotation of a driving shaft to a driven shaft includes a two-way clutch and an electromagnetic clutch for selectively engaging and disengaging the two-way clutch.

The rotation transmission device disclosed in Japanese Patent Publication 2009-293679A includes an outer ring, an inner ring mounted inside the outer ring, and a control retainer member and a rotary retainer member each having bars and mounted between the inner and outer rings such that the bars of the control retainer member are arranged circumferentially alternating with the bars of the rotary retainer member, whereby pockets are defined between circumferentially adjacent pairs of the bars of the respective retainer members. The rotation transmission device further includes rollers each two of which are mounted in one of the pockets, and elastic members each mounted in one of the pockets and biasing the two rollers in the one of the pockets away from each other to a stand-by position where the rollers can instantly engage a cylindrical surface formed on the inner periphery of the outer ring and one of cam surfaces formed on the outer periphery of the inner ring such that when the inner ring rotates in either direction, one of each pair of rollers engages the cylindrical surface and the cam surface, thereby transmitting rotation of the inner ring to the outer ring.

The rotation transmission device further includes an electromagnetic clutch mounted on an input shaft connected to the inner ring. The electromagnetic clutch is configured to move the control retainer member in the axial direction. When the control retainer member is moved in the axial direction by the electromagnetic clutch, the retainer members are rotated relative to each other in the direction in which the circumferential widths of the pockets decrease due to the action of a torque cam provided between the opposed surfaces of a flange of the control retainer member and a flange of the rotary retainer member, thereby moving the pairs of rollers in the respective pockets to the disengaged position and thus preventing transmission of rotation from the inner ring to the outer ring.

In this rotation transmission device, when the control retainer member is moved by the electromagnetic clutch in the direction in which the flange of the control retainer member moves away from the flange of the rotary retainer member, the control retainer member and the rotary retainer member are rotated relative to each other in the direction in which the circumferential widths of the pockets increase under the biasing force of the elastic members mounted between the respective pairs of rollers. Thus the rollers can instantly engage the cylindrical surface and the cam surfaces, so that the rollers scarcely move in the circumferential direction when engaging the cylindrical surface and the cam surfaces, and the response time is short too.

In the rotation transmission device disclosed in Japanese Patent Publication 2009-293679A, the two-way clutch constituted by the inner and outer rings, the pairs of rollers and the retainer members, and the electromagnetic clutch for controlling the two-way clutch are covered by a housing. With the two-way clutch and the electromagnetic clutch mounted in position in the housing, if the two-way clutch and the electromagnetic clutch are movable relative to each other or relative to any other members of the device, it is impossible to control the two-way clutch with high accuracy.

In order to avoid this problem, it has been an ordinary practice to insert a shim between the opposed portions of the built-in components comprising the two-way clutch and the electromagnetic clutch to keep these components immovable. But in order to reliably keep the built-in components immovable, it is necessary to insert shims having different thicknesses one by one to select the most suitable one. This step is extremely troublesome. The shim increases the number of parts and thus the cost, of the rotation transmission device. It is therefore desired to assemble the rotation transmission device more easily and to reduce the cost.

SUMMARY OF THE INVENTION

An object of this invention is to provide a rotation transmission device which includes a two-way clutch and an electromagnetic clutch for selectively engaging and disengaging the two-way clutch, and which can be assembled easily by using no shims to keep the clutches immovable.

In order to achieve this object, the present invention provides a rotation transmission device comprising an input shaft, an output shaft arranged coaxial with the input shaft, a two-way clutch for selectively transmitting torque between the input shaft and the output shaft, and an electromagnetic clutch for selectively engaging and disengaging the two-way clutch, wherein the electromagnetic clutch includes an electromagnet and is configured to disengage the two-way clutch when the electromagnet is de-energized, wherein the rotation transmission device further comprises a tubular housing in which the two-way clutch and the electromagnetic clutch are received, wherein the housing has a first opening at a first end of the housing and a second opening at a second end of the housing which is opposite to the first end, wherein a positioning arrangement is provided in the housing near the first end to prevent the two-way clutch from moving toward the first opening, wherein an anti-separation ring is provided on the inner periphery of the housing at the second end of the housing to prevent the electromagnetic clutch from coming out of the housing through the second end of the housing, and wherein the rotation transmission device further comprises an elastic member biasing the two-way clutch and the electromagnetic clutch toward at least one of the anti-separation ring and the positioning arrangement.

By providing the elastic member for biasing the built-in components comprising the two-way clutch and the electromagnetic clutch toward one of the positioning arrangement axially positioning the built-in components and the anti-separation ring preventing the built-in components from coming out of the housing, it is possible to keep the built-in components stationary in the housing.

This eliminates the need for adjustment using shims, and thus makes it possible to easily assemble the rotation transmission device and thus to reduce its cost.

The elastic member may be a wave spring or a disk spring. Also, the elastic member may be supported by the positioning arrangement such that the built-in components comprising the two-way clutch and the electromagnetic clutch are biased toward the anti-separation ring by the elastic member.

Otherwise, the elastic member may be disposed between the anti-separation ring and the electromagnetic clutch to bias the built-in components comprising the two-way clutch and the electromagnetic clutch toward the positioning arrangement. In this case, the anti-separation ring may function as the elastic member for biasing the built-in components toward the positioning arrangement. With this arrangement, it is possible to further reduce the number of parts.

The two-way clutch of the rotation transmission device according to the present invention may comprise an outer ring provided at an end of the output shaft, an inner ring provided at an end of the input shaft, and a control retainer member and a rotary retainer member which are disposed between opposed portions of the outer ring and the inner ring, wherein the control retainer member includes a plurality of circumferentially spaced apart first bars, wherein the rotary retainer member includes a plurality of circumferentially spaced apart second bars which are arranged circumferentially alternating with the first bars, whereby pockets are defined between circumferentially adjacent pairs of the first and second bars, wherein the two-way clutch further comprises a plurality of engaging elements each two of which are mounted in one of the pockets, and elastic members each mounted in one of the pockets and biasing the two engaging elements in the one of the pockets away from each other, wherein the control retainer member and the rotary retainer member are configured to be rotated relative to each other in the direction in which the circumferential widths of the pockets increase until the engaging elements engage the inner periphery of the outer ring and the outer periphery of the inner ring.

The electromagnetic clutch may comprise an armature coupled to the control retainer member, a rotor facing the armature in the axial direction, and an electromagnet facing the rotor in the axial direction and configured to attract the armature to the rotor when the electromagnet is energized such that the control retainer member and the rotary retainer member are rotated relative to each other in the direction in which the circumferential widths of the pockets decrease, until the engaging elements disengage.

The rotation transmission device in which the above-described two-way clutch and electromagnetic clutch are used may further include a support ring fitted on the input shaft and slidably supporting the armature, wherein the control retainer member further comprises a flange supporting the first bars, and wherein the input shaft is formed with a slide guide surface slidably supporting the radially inner surface of the flange. With this arrangement, since the armature is slidably supported by two axially spaced apart surfaces, the armature is always kept parallel to the rotor.

Thus, the gap defined between the opposed surfaces of the armature and the rotor is uniform over the entire circumference. This makes it possible to reliably attract the armature to the rotor by energizing the electromagnet, which in turn makes it possible to engage and disengage the rollers with high accuracy.

The support ring is preferably made of a non-magnetic material to prevent leakage of magnetic fluxes from the armature into the input shaft and thus to make it possible to use a smaller electromagnet.

The non-magnetic material may be a non-magnetic metal, or a resin. If a resin is used, it is preferably a self-lubricating resin such as polyacetal (POM), polyamide (PA), polytetrafluoroethylene (PTFE) or polyphenylene sulfide (PPS), because such a resin reduces sliding resistance of the armature, allowing smooth axial movement of the armature.

According to this invention, since the built-in components comprising the two-way clutch and the electromagnetic clutch are positioned axially by the positioning arrangement, prevented from separation by the anti-separation ring, and are biased toward one of the positioning arrangement and the anti-separation ring by the elastic member, the built-in components are kept immovable without the need for a shim.

Thus, the rotation transmission device according to the present invention can be assembled easily and manufactured at a low cost.

DETAILED DESCRIPTION OF THE INVENTION

Figure 1:
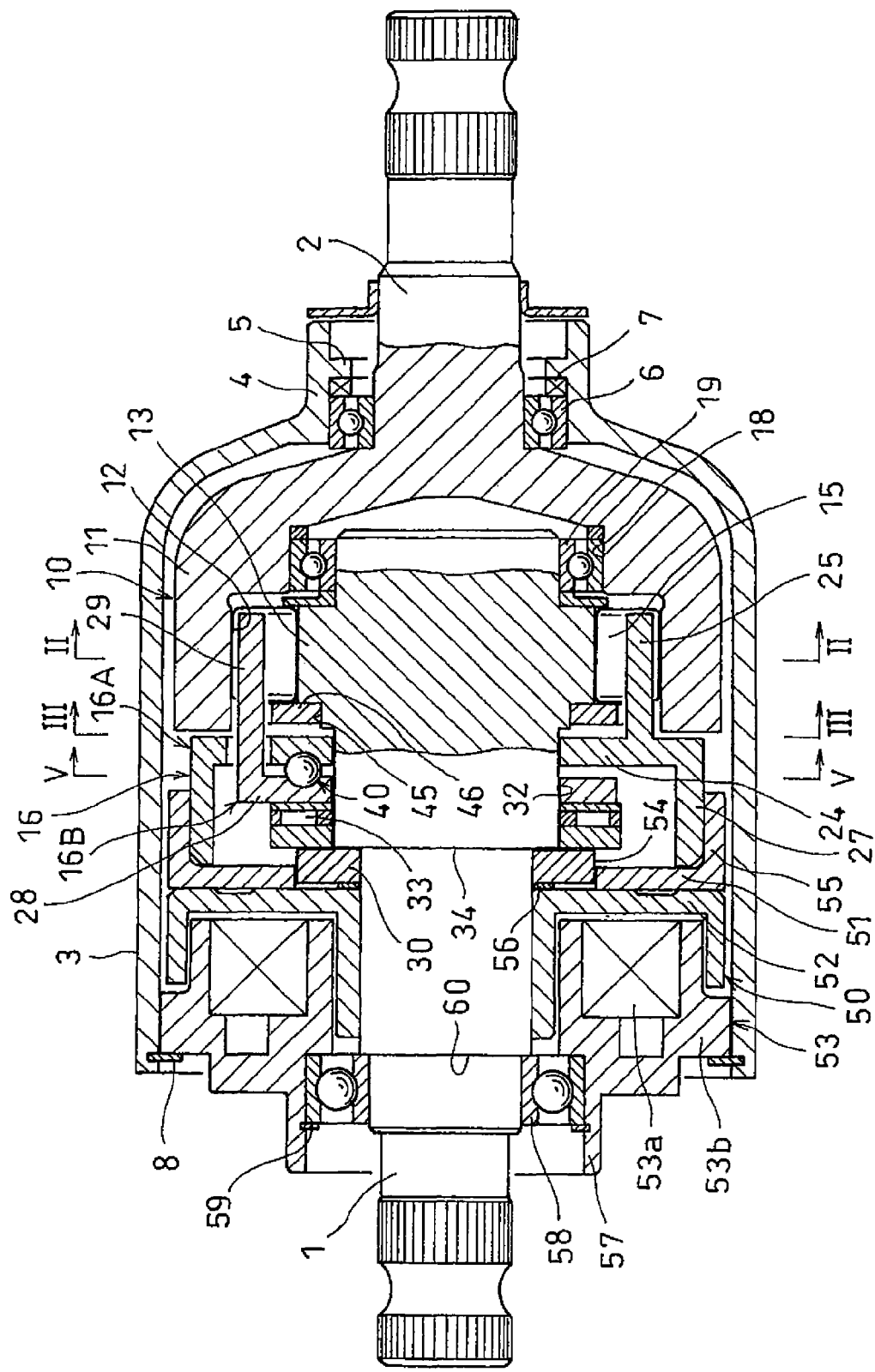
FIG. 1 is a vertical sectional front view of a rotation transmission device embodying the present invention.

Now the embodiments of the present invention are described with reference to the drawings. FIG. 1 shows a rotation transmission device embodying the present invention. As shown, this rotation transmission device includes an input shaft 1, an output shaft 2 arranged coaxial with the input shaft 1, a housing 3 surrounding the opposed end portions of the input and output shafts 1 and 2, a two-way clutch 10 mounted in the housing 3 and configured to selectively transmit rotation from the input shaft 1 to the output shaft 2, and an electromagnetic clutch 50 for selectively engaging and disengaging the two-way clutch 10.

The housing 3 is a cylindrical member having a bearing tube 4 at one end thereof. The bearing tube 4 is provided with a positioning arrangement (or positioning part) 5 on its inner periphery. A bearing 6 and an elastic member 7 (constituting an elastic configuration) are mounted in the bearing tube 4. The bearing 6 rotatably supports the output shaft 2. The positioning arrangement 5 is a ring-shaped portion integrally formed on the inner periphery of the bearing tube 4. But instead, the positioning arrangement 5 may be made up of a plurality of annularly arranged protrusions. Further alternatively, the positioning arrangement may be in the form of a member separate from the bearing tube 4 and mounted in the bearing tube 4.

The elastic member 7 biases the two-way clutch 10 and the electromagnetic clutch 50, which selectively engages and disengages the two-way clutch 10, toward an anti-separation ring 8 in the form of a snap ring mounted on the inner periphery of the housing 3 at the other open end thereof, thereby pressing the electromagnetic clutch 50 against the anti-separation ring 8. The elastic member 7 thus keeps the two-way clutch 10 and the electromagnetic clutch 50 stationary in the housing 3.

Figure 7:
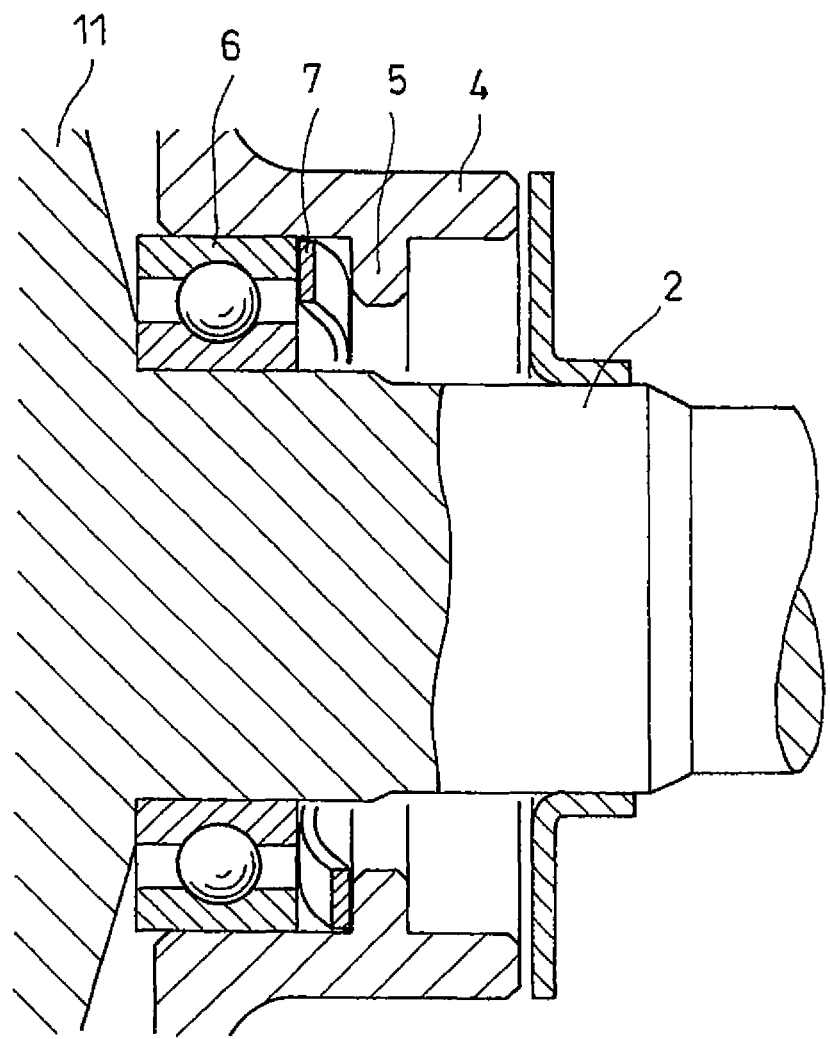
FIG. 7 is an enlarged sectional view of a support portion supporting an outer ring of FIG. 1.

In the embodiment, the elastic member 7 is a wave spring as shown in FIG. 7. But a disk spring may be used instead.

Figure 2:
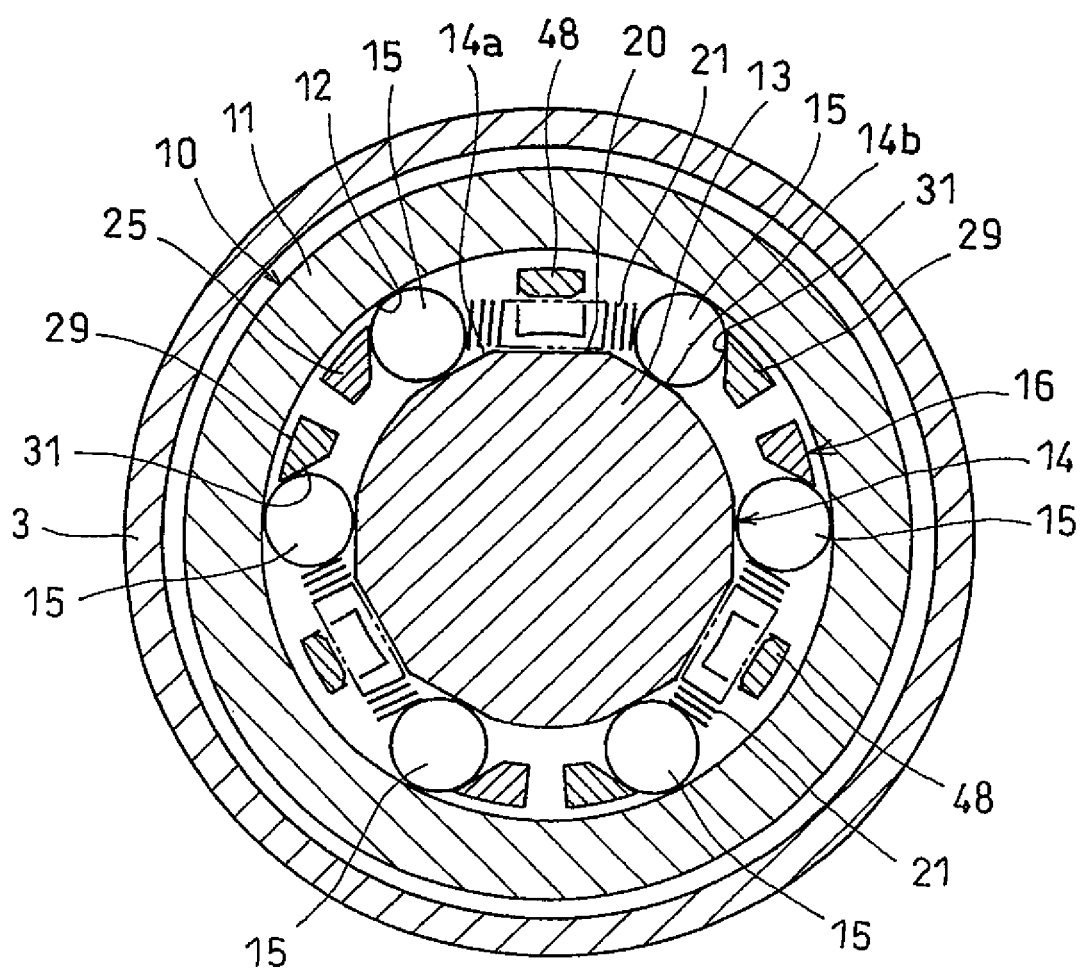
FIG. 2 is a sectional view taken along line II-II of FIG. 1.

As shown in FIGS. 1 and 2, the two-way clutch 10 includes an outer ring 11 provided at the end of the output shaft 2 and formed with a cylindrical surface 12 on the inner periphery thereof, and an inner ring 13 provided at the end of the input shaft 1 and formed with a plurality of circumferentially arranged cam surfaces 14 on the outer periphery thereof. A pair of rollers 15 as engaging elements, and an elastic member 21 are mounted between each of the cam surfaces 14 and the cylindrical surface 12. The rollers 15 are retained by a retainer 16 such that when the inner ring 13 rotates in one direction, one of each pair of the rollers 15 engages the cylindrical surface 12 and the corresponding cam surface 14, allowing the rotation of the inner ring 13 to be transmitted to the outer ring 11, and when the inner ring 13 rotates in the other direction, the other of each pair of the rollers 15 engages the cylindrical surface 12 and the cam surface 14, allowing the rotation of the inner ring 13 in this direction to be transmitted to the outer ring 11.

As shown in FIG. 1, the outer ring 11 is formed with a small-diameter recess 18 in the inner surface of the closed end of the outer ring 11. A bearing 19 is mounted in the small-diameter recess 18 to rotatably support the input shaft 1, which has the inner ring 13 at its end.

Figure 8:
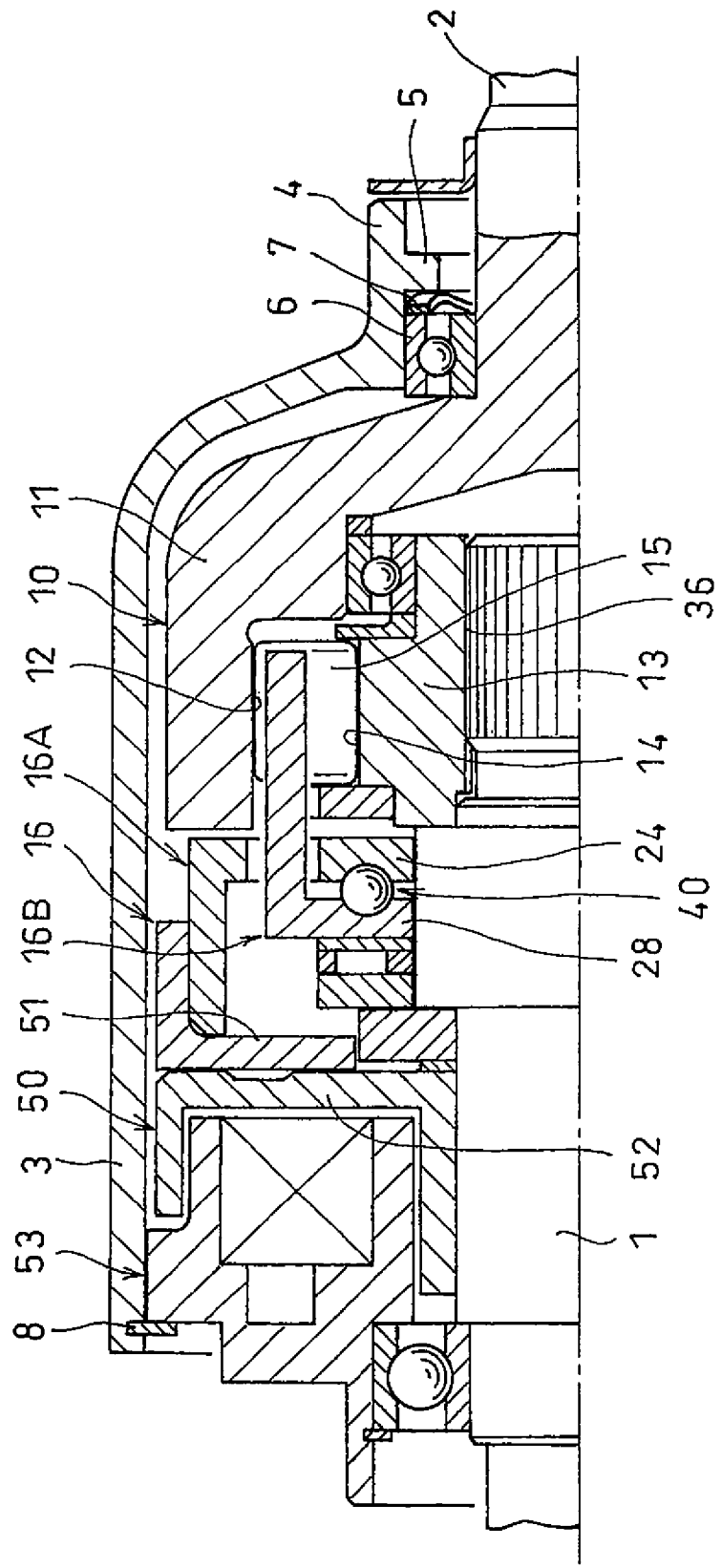
FIG. 8 is a vertical sectional front view of a rotation transmission device according to another embodiment of the present invention.

In FIG. 1, the inner ring 13 is integrally provided at the end of the input shaft 1. But as shown in FIG. 8, the inner ring 13 may be a member separate from the input shaft 1 and fitted on and coupled to the end of the input shaft 1 by serrations 36 formed on the fitting surfaces thereof.

As shown in FIG. 2, the cam surfaces 14, which are formed on the outer periphery of the inner ring 13, each include a pair of inclined surface portions 14a and 14b inclined in the opposite directions to each other to define a wedge-shaped space which is narrow at both circumferential ends thereof between each of the inclined surface portions 14a and 14b and the cylindrical surface 12 of the outer ring 11. Tangentially extending flat spring support surfaces 20 are formed between the respective pairs of inclined surface portions 14a and 14b and support the respective elastic members 21.

Figure 4:
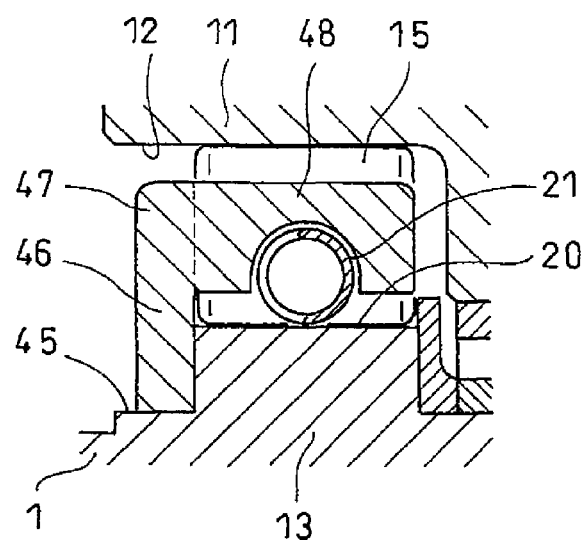
FIG. 4 is a sectional view taken along line IV-IV of FIG. 3.

In the embodiment of FIG. 4, the elastic members 21 have a circular cross-section and are made of wires having a rectangular cross-section. But the elastic members 21 are not limited thereto. As shown in FIG. 2, the elastic members 21 are mounted between the pair of rollers 15 while being supported on the support surface 20 to bias the pair of rollers 15 away from each other.

Figure 5:
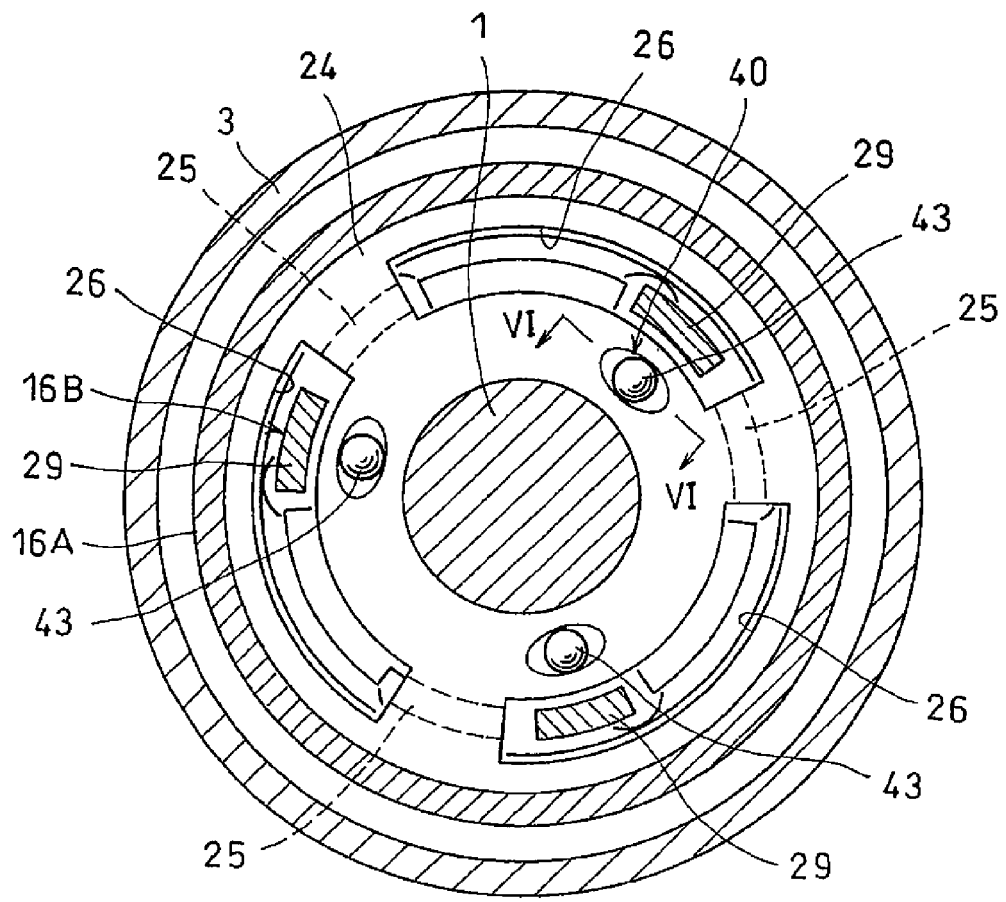
FIG. 5 is a sectional view taken along line V-V of FIG. 1.

As shown in FIG. 1, the retainer 16 includes a control retainer member 16A and a rotary retainer member 16B. As shown in FIGS. 1 and 5, the control retainer member 16A includes an annular flange 24, and bars 25 equal in number to the number of the cam surfaces 14 and extending from the radially outer portion of one side of the annular flange 24 while being circumferentially equidistantly spaced from each other. The annular flange 24 is formed with circular arc-shaped elongated holes 26 between the respective adjacent pairs of bars 25. The control retainer member 16A further includes a tubular portion 27 extending from the radially outer edge of the annular flange 24 in the opposite direction to the bars 25.

The rotary retainer member 16B comprises an annular flange 28, and bars 29 equal in number to the number of the cam surfaces 14 and extending from the radially outer edge of the annular flange 28 while being circumferentially equidistantly spaced from each other.

The control retainer member 16A and the rotary retainer member 16B are combined together in such a way that the bars 29 of the rotary retainer member 16B are received in the respective elongated holes 26 of the control retainer member such that the bars 25 of the control retainer member 16A and the bars 29 of the rotary retainer member 16B are arranged circumferentially alternating with each other. In this combined state, the distal ends of the bars 25 and 29 are disposed between the outer ring 11 and the inner ring 13, while the flange 24 of the control retainer member 16A and the flange 28 of the rotary retainer member 16B are disposed between the outer ring 11 and a support ring 30 fitted on the outer periphery of the input shaft 1.

With the retainer members 16A and 16B mounted in position in this manner, as shown in FIG. 2, pockets 31 are defined between the respective bars 25 of the control retainer member 16a and the corresponding bars 29 of the rotary retainer member 16B so as to radially face the respective cam surfaces 14 of the inner ring 13. A pair of the rollers 15 and one of the elastic members 21 are received in each pocket 31 with the rollers facing each other.

The flange 24 of the control retainer member 16A and the flange 28 of the rotary retainer member 16B are supported so as to be slidable along a slide guide surface 32 formed on the outer periphery of the input shaft 1. A thrust bearing 33 is mounted between the flange 28 of the rotary retainer member 16B and the support ring 30 of the input shaft 1.

Figure 6A:
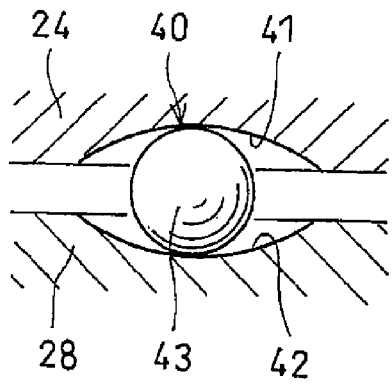
FIG. 6(a) is a sectional view taken along line VI-VI of FIG. 5.
Figure 6B:
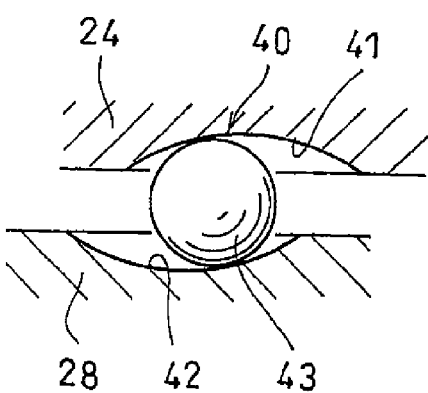
FIG. 6(b) is a sectional view showing an operational state.

As shown in FIGS. 1, 5 and 6(b), a motion converter mechanism in the form of a torque cam 40 is provided between the flange 24 of the control retainer member 16A and the flange 28 of the rotary retainer member 16B to convert the axial movement of the control retainer member 16A to the rotary motion of the rotary retainer member 16B. The torque cam 40 includes an opposed pairs of cam grooves 41 and 42 formed in the respective opposed surfaces the flange 24 of the control retainer member 16A and the flange 28 of the rotary retainer member 16B. The cam grooves 41 and 42 are each deepest at the circumferential center and its depth gradually decreases toward the respective circumferential ends. A ball 43 is mounted between one circumferential end of one of each opposed pair of cam grooves 41 and 42 and the opposite circumferential end of the other of the pair of cam grooves 41 and 42.

The cam grooves 41 and 42 shown are circular arc-shaped grooves. But V-shaped cam grooves may be used instead.

When the control retainer member 16A is moved in the axial direction in which the flange 24 of the control retainer member 16A approaches the flange 28 of the rotary retainer member 16B, the balls 43 of the torque cam 40 roll toward the deepest points of the respective opposed pairs of cam grooves 41 and 42 (shown in FIG. 6(a)), thereby rotating the control retainer member 16A and the rotary retainer member 16B relative to each other in the direction in which the circumferential widths of the pockets 31 decrease.

Figure 3:
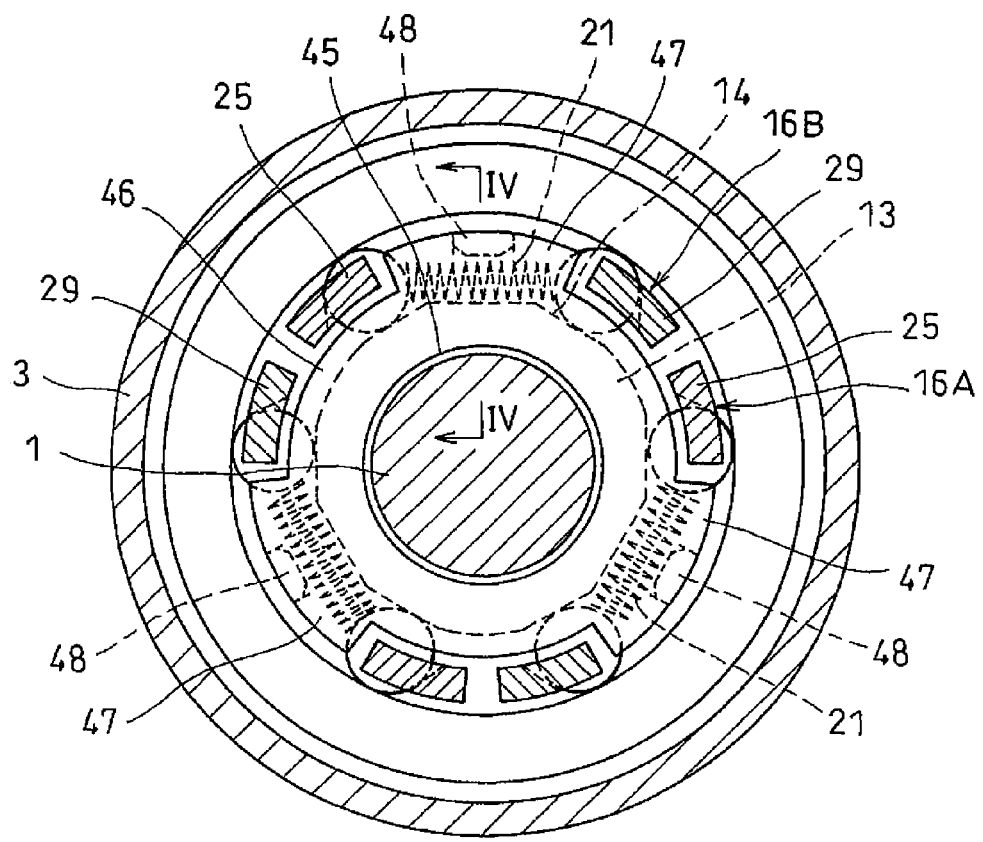
FIG. 3 is a sectional view taken along line III-III of FIG. 1.

As shown in FIGS. 3 and 4, the inner ring 13 is formed with a small-diameter cylindrical surface 45 on one axial side of the cam surfaces 14 remote from the bearing tube 4. An annular retaining plate 46 is fitted on the cylindrical surface 45 and fixed to the inner ring 13. A plurality of anti-rotation pieces 47 are formed on the outer peripheral surface of the retaining plate 46 and received in the respective pockets 31 defined between the bars 25 of the control retainer member 16A and the bars 29 of the rotary retainer member 16B.

The anti-rotation pieces 47 are configured such that when the control retainer member 16A and the rotary retainer member 16B rotate relative to each other in the direction in which the circumferential widths of the pockets 31 decrease, the anti-rotation pieces 47 support the bars 25 of the control retainer member 16A and the bars 29 of the rotary retainer member 16B along their respective side edges, thereby keeping the respective opposed pairs of rollers 15 in the neutral position.

The retaining plate 46 has at its outer peripheral portion presser arms 48 extending at positions radially outwardly of the respective elastic members 21, thus preventing the elastic members 21 from being deflected radially outwardly away from the spaces between the respective opposed pairs of rollers 15.

As shown in FIG. 1, the electromagnetic clutch 50 includes an armature 51 axially facing the end surface of the tubular portion 27 of the control retainer member 16A, a rotor 52 axially facing the armature 51, and an electromagnet 53 axially facing the rotor 52.

The armature 51 is fitted on the outer periphery of the support ring 30 of the input shaft 1 so as to be rotatable and slidable relative to the support ring 30. The tubular portion 27 of the control retainer member 16A is press-fitted in a coupling tube 55 provided at the outer peripheral portion of the armature 51, so that the control retainer member 16A and the armature 51 are fixedly coupled together. Since these two members are coupled together, the armature 51 is slidably supported by two axially spaced apart surfaces, i.e. by the cylindrical radially outer surface 54 of the support ring 30 and by the slide guide surface 32 on the outer periphery of the input shaft 1.

The rotor 52 is press-fitted on the input shaft 1. A shim 56 is disposed between the rotor 52 and the support ring 30 mounted on the outer periphery of the input shaft 1.

The support ring 30 is axially positioned by a step 34 formed on the input shaft 1 on one axial side of the slide guide surface 32 remote from the bearing tube 4. Thus, by mounting the shim 56 between the support ring 30 and the rotor 52, the rotor 52 is also axially positioned.

The support ring 30 is made of a non-magnetic material which may be a non-magnetic metal or a resin.

As shown in FIG. 1, the electromagnet 53 comprises an electromagnetic coil 53a, and a core 53b supporting the electromagnetic coil 53a. The core 53b includes a tubular portion 57 on its outer end surface in which a bearing 58 is mounted which is prevented from coming out of the tubular portion 57 by a snap ring 59 fitted on the inner periphery of the tubular portion 57. The bearing 58 is axially positioned by s step 60 formed on the radially outer surface of the input shaft 1 and the snap ring 59, and supports the electromagnet 53 and the input shaft 1 to be rotatable relative to each other.

The core 53b is mounted in the housing 3 at its end remote from the bearing tube 4. The core 53b is prevented from coming out of the housing 3 by being biased by the elastic member 7 mounted in the bearing tube 4 and pressed against the anti-separation ring 8 mounted on the inner periphery of the hosing 3 at its other open end.

FIG. 1 shows the rotation transmission device of this embodiment while the electromagnetic coil 53a of the electromagnet 53 is not being activated and thus the armature 51 is spaced apart from the rotor 52. In this state, as shown in FIG. 5, the respective opposed pairs of rollers 15 of the two-way clutch 10 are in a stand-by position where the rollers 15 can instantly engage the cylindrical surface 12 of the outer ring 11 and the cam surfaces 14 of the inner ring 13. While in FIG. 1, the armature 51 and the rotor 52 appear to be in close contact with each other, a gap actually exists between the armature 51 and the rotor 52.

With the two-way clutch 10 in the stand-by position, when the electromagnetic coil 53a is energized, an attraction force is applied to the armature 51, so that the armature 51 is axially pulled toward and pressed against the rotor 52.

In this state, since the armature 51 is fixedly coupled to the control retainer member 16A, when the armature 51 is moved axially, the control retainer member 16A is moved in the direction in which the flange 24 of the control retainer member 16A approaches the flange 28 of the rotary retainer member 16B.

At this time, the balls 43 move from the position shown in FIG. 6(b) to the position shown in FIG. 6(a), in which the balls 43 are at the deepest points of the respective cam grooves 41 and 42, thus causing the control retainer member 16A and the rotary retainer member 16B to be rotated relative to each other in the direction in which the circumferential widths of the pockets 31 decrease. Thus, each opposed pair of rollers 15, shown in FIG. 2, are pushed by the bar 25 of the control retainer member 16A and the bar 29 of the rotary retainer member 16B, respectively, toward each other, until the rollers 15 move to a neutral position where the rollers 15 are disengaged from the cylindrical surface 12 and the cam surfaces 14. The two-way clutch 10 thus disengages.

With the two-way clutch 10 disengaged, when torque is applied to the input shaft 1 such that the inner ring 13 rotates in one direction, the anti-rotation pieces 47 formed on the retaining plate 46 push either the bars 25 of the control retainer member 16A or the bars 29 of the rotary retainer member 16B, thus rotating the control retainer member 16A and the rotary retainer member 16B together with the inner ring 13. At this time, since the opposed pairs of rollers 15 are in the disengaged neutral position, the rotation of the inner ring 13 is not transmitted to the outer ring 11, so that the inner ring 13 rotates freely.

When the control retainer member 16A and the rotary retainer member 16B rotate relative to each other in the direction in which the circumferential widths of the pockets 31 decrease, the bars 25 of the control retainer member 16A and the bars 29 of the rotary retainer member 16B abut the respective side edges of the anti-rotation pieces 47 of the retaining plate 46, preventing any further relative rotation between the retainer members 16A and 16B.

This in turn prevents the elastic members 21 from being compressed more than necessary, and thus prevents breakage of the elastic members 21 due to fatigue even though the elastic members 21 are repeatedly compressed and expanded.

With the inner ring 13 rotating alone, if the electromagnetic coil 53a is de-energized, the attraction force applied to the armature 51 disappears, so that the armature 51 becomes rotatable. This in turn allows the control retainer member 16A and the rotary retainer member 16B to be rotated relative to each other in the direction in which the circumferential widths of the pockets 31 increase, under the biasing force of the elastic members 21, until the rollers 15 are moved to the stand-by position, where the rollers 15 can instantly engage the cylindrical surface 12 and the cam surfaces 14 (see FIG. 2). In this state, torque is transmitted between the inner ring 13 and the outer ring 11 through one of each opposed pair of rollers 15.

If in this state the input shaft 1 is stopped and then rotated in the opposite direction, the rotation of the inner ring 13 is transmitted to the outer ring 11 through the other of each opposed pair of rollers 15.

When the electromagnetic coil 53a is de-energized, since the control retainer member 16A and the rotary retainer member 16B are rotated relative to each other in the direction in which the circumferential widths of the pockets 31 increase such that the rollers 15 are moved to the stand-by position, where the opposed pairs of rollers 15 can instantly wedge into the cylindrical surface 12 and the respective cam surfaces 14, the rollers 15 scarcely move in the rotational direction when the clutch engages, and the rotation of the inner ring 13 can be instantly transmitted to the outer ring 11.

Since the rotation of the inner ring 13 is transmitted to the outer ring 11 through rollers 15 which are equal in number to the cam surfaces 14, it is possible to transmit large torque from the inner ring 13 to the outer ring 11.

When the control retainer member 16A and the rotary retainer member 16B rotate relative to each other in the direction in which the circumferential widths of the pockets 31 increase, the balls 43 roll toward the shallow portions of the respective opposed pairs of cam grooves 41 and 42 until the balls 43 reach the position shown in FIG. 6(b).

Since the rotation transmission device is configured such that when the electromagnetic clutch 50 is switched off by de-energizing the electromagnet 53 of the electromagnetic clutch 50, the two-way clutch 10 engages, while when the electromagnetic clutch 50 is switched on, the two-way clutch 10 disengages, this rotation transmission device is extremely advantageous in applications where a fail-safe mechanism is required.

In the embodiment of FIG. 1, since the control retainer member 16A and the rotary retainer member 16B are mounted such that the bars 25 and 29 thereof are disposed between the outer ring 11 and the inner ring 13, while the flanges 24 and 28 thereof, which axially face each other, are disposed between the outer ring 11 and the armature 51, the outer ring 11 is short in axial length and lightweight.

Also, since, firstly, the coupling tube 55 of the armature 51 is fixedly coupled to the tubular portion 27 formed on the outer peripheral portion of the flange of the control retainer member 16A by press-fitting the former on the latter; secondly, the radially inner surface of the armature 51 is slidably supported by the cylindrical radially outer surface of the support ring 30 fitted on the input shaft 1; and thirdly, the radially inner surface of the flange of the control retainer member 16A is movably supported by the slide guide surface 32 formed on the outer periphery of the input shaft 1, the armature 51 is always kept in a position extending parallel to the rotor 52. This makes it possible to reliably magnetically pull the armature 51 to the rotor 15 when the electromagnet 53 is energized, which in turn makes it possible to engage and disengage the rollers 15 with high accuracy.

In the embodiment, since the support ring 30 fitted on the input shaft 1 is made of a nonmagnetic material, magnetic fluxes never leak from the armature 51 into the input shaft 1, which makes it possible to use a smaller electromagnet 53.

In the embodiment of FIG. 1, the elastic member 7 mounted in the bearing tube 4 of the housing 3 biases the built-in components mounted in the housing 3, which comprise the two-way clutch 10 and the electromagnetic clutch 50 for controlling the two-way clutch 10, toward the anti-separation ring 8 fitted on the inner periphery of the housing 3 at its other end, thereby pressing the electromagnet 53 of the electromagnetic clutch 50 against the anti-separation ring 8. With this arrangement, the built-in components 10 and 50 are kept stationary in the housing 3.

This eliminates the necessity to select a proper shim and insert it in the housing to keep the built-in components stationary in the housing, which in turn makes it possible to easily assemble the rotation transmission device and thus to reduce its cost.

Figure 9:
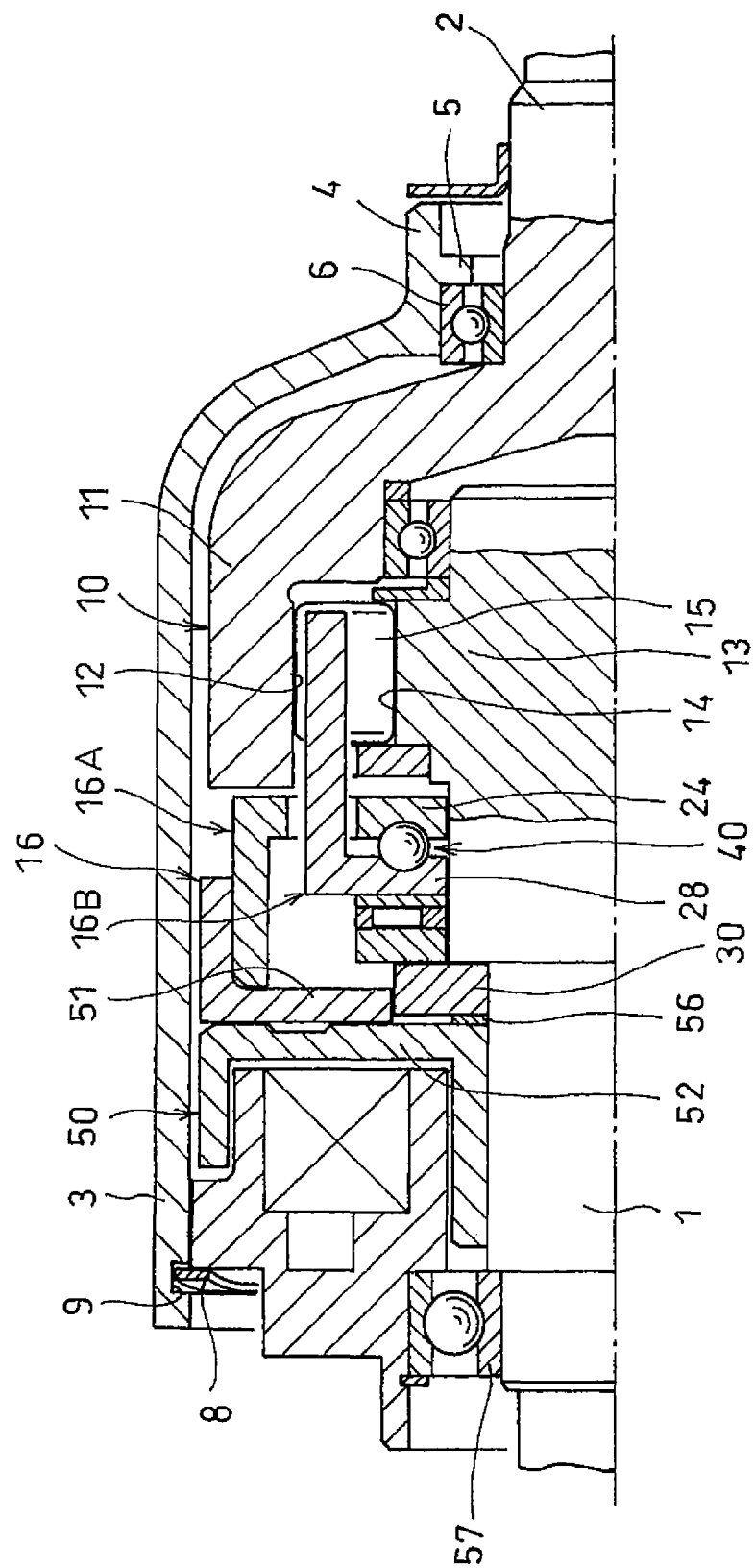
FIG. 9 is a vertical sectional front view of a rotation transmission device according to still another embodiment of the present invention.

FIG. 9 shows a rotation transmission device according to another embodiment of the present invention. This embodiment differs from the rotation transmission device shown in FIG. 1 in that the anti-separation ring 8 is an elastic member (i.e., constitutes the elastic configuration) having its outer peripheral portion fitted in an annular groove 9 formed in the inner periphery of the housing 3 at its other end so as not to be pulled out of the groove 9 such that this anti-separation ring 8 prevents the built-in components mounted in the housing 3, which comprise the two-way clutch 10 and the electromagnetic clutch 50 for controlling the two-way clutch 10, from coming out of the housing 3, and simultaneously biases the built-in components 10 and 50 toward the positioning arrangement 5 provided on the bearing tube 4.

Thus, elements of this embodiment corresponding to those shown in FIG. 1 are denoted by identical numerals and their description is omitted.

In this embodiment too, the built-in components can be kept stationary in the housing. Also, since the elastic member 7 shown in FIG. 1 is not used in this embodiment, the rotation transmission device of this embodiment includes fewer parts, is less expensive, and can be assembled more easily, than that of FIG. 1.

The elastic member 8 is a wave spring in FIG. 9, but may be a disk spring instead.

The two-way clutch 10 of the embodiment of FIG. 2 is configured such that when the electromagnet 53 is de-energized, the control retainer member 16A is moved axially and the control retainer member 16A and the rotary retainer member 16B are rotated relative each other in such a direction that the rollers 15 as the engaging elements engage the inner periphery of the outer ring 11 and the outer periphery of the inner ring 13. But the two-way clutch 10 is not limited thereto.

Figure 10:
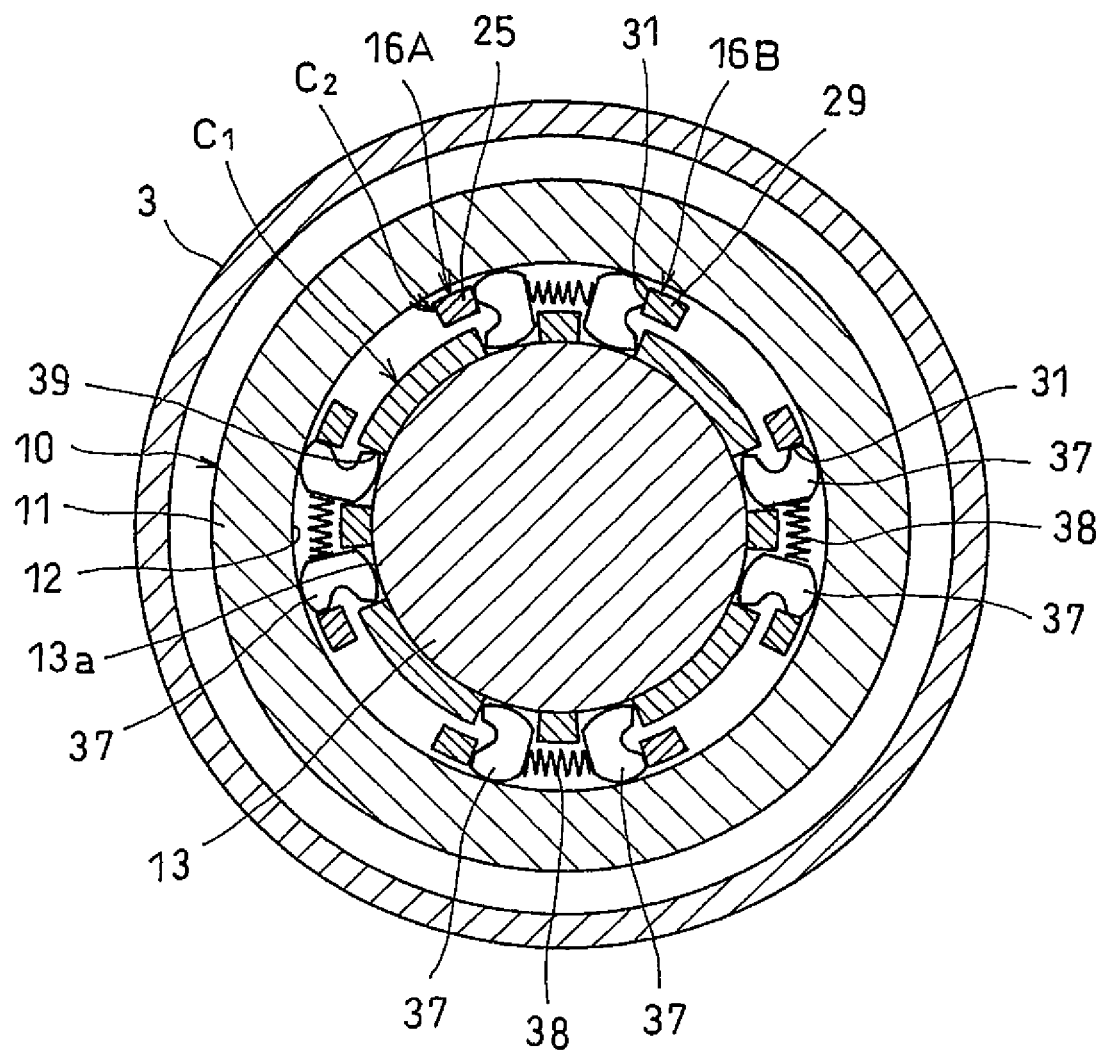
FIG. 10 is a sectional view of a different two-way clutch.

For example, the two-way clutch may be a sprag type clutch shown in FIG. 10, which includes a small-diameter retainer $C_1$, and a large-diameter retainer $C_2$ provided around the small-diameter retainer $C_1$ and comprising a control retainer member 16A and a rotary retainer member 16B which are exactly identical to the retainer members 16A and 16B used in the embodiment of FIGS. 1 and 2. A pair of sprags 37, as engaging elements, and an elastic member 38 are mounted in each of the pockets 31 defined between adjacent pairs of the bars 25 of the control retainer member 16A and the bars 29 of the rotary retainer member 16B, with the elastic member 38 disposed between the pair of sprags 37. The sprags 37 have their inner ends inserted in respective ones of pockets 39 formed in the small-diameter retainer $C_1$ so as to be pivotable about the inner ends.

In the embodiment in which the sprag type two-way clutch 10 is used, when the electromagnet 53 is de-energized, each pair of sprags 37 are pivoted such that their outer ends move away from each other under the biasing force of the elastic member 38, thus engaging the inner cylindrical surface 12 of the outer ring 11 and the outer cylindrical surface 13a of the inner ring 13. When the electromagnet 53 is energized, the control retainer member 16A is moved axially and simultaneously, the control retainer member 16A and the rotary retainer member 16B are rotated relative to each other in such a direction that the bars 25 and 29 of the respective retainer members push the sprags 37 such that the outer ends of each pair of sprags 37 move toward each other, until the sprags 37 disengage from the inner cylindrical surface 12 of the outer ring 11 and the outer cylindrical surface 13a of the inner ring 13.

What is claimed is:
1. A rotation transmission device comprising:
an input shaft;
an output shaft arranged coaxial with the input shaft;
a two-way clutch for selectively transmitting torque between the input shaft and the output shaft;
an electromagnetic clutch for selectively engaging and disengaging the two-way clutch, wherein the electromagnetic clutch includes an electromagnet and is configured to disengage the two-way clutch when the electromagnet is de-energized;
a tubular housing in which the two-way clutch and the electromagnetic clutch are received, wherein the hous- ing has a first opening at a first end of the housing and a second opening at a second end of the housing which is opposite to the first end;

a positioning part provided in the housing near the first end to limit movement of the two-way clutch in a direction away from the second opening and toward the first opening; and an anti-separation ring provided on an inner periphery of the housing at the second end of the housing to limit movement of the electromagnetic clutch in a direction away from the first opening and toward the second opening so as to prevent the electromagnetic clutch from coming out of the housing through the second end of the housing;

wherein an elastic configuration is provided to bias the two-way clutch and the electromagnetic clutch toward one of the first and second ends of the housing, said elastic configuration being constituted by one of the anti-separation ring being configured to bias the two-way clutch and the electromagnetic clutch toward the positioning part, and an elastic member separate from the anti-separation ring and being configured to bias the two-way clutch and the electromagnetic clutch toward the anti-separation ring;

wherein the two-way clutch comprises an outer ring provided at an end of the output shaft, an inner ring provided at an end of the input shaft, and a control retainer member and a rotary retainer member which are disposed between opposed portions of the outer ring and the inner ring, wherein the control retainer member includes a plurality of circumferentially spaced apart first bars, wherein the rotary retainer member includes a plurality of circumferentially spaced apart second bars which are arranged circumferentially alternating with the first bars, whereby pockets are defined between circumferentially adjacent pairs of the first and second bars, wherein the two-way clutch further comprises a plurality of engaging elements each two of which are mounted in one of the pockets, and elastic elements each mounted in one of the pockets and biasing the two engaging elements in the one of the pockets away from each other, wherein the control retainer member and the rotary retainer member are configured to be rotated relative to each other in a direction in which circumferential widths of the pockets increase until the engaging elements engage an inner periphery of the outer ring and an outer periphery of the inner ring, under the biasing force of the elastic elements; and wherein the electromagnetic clutch comprises an armature coupled to the control retainer member, a rotor facing the armature in an axial direction, and an electromagnet facing the rotor in the axial direction and configured to attract the armature to the rotor when the electromagnet is energized such that the control retainer member and the rotary retainer member are rotated relative to each other in a direction in which the circumferential widths of the pockets decrease, until the engaging elements disengage.

2. The rotation transmission device of claim 1, wherein the elastic configuration is constituted by the elastic member, and the elastic member is supported by the positioning part.

3. The rotation transmission device of claim 1, wherein the elastic configuration is constituted by the anti-separation ring.

4. The rotation transmission device of claim 1, wherein the elastic configuration comprises a wave spring.

5. The rotation transmission device of claim 1, wherein the elastic configuration comprises a disk spring.

6. The rotation transmission device of claim 1, further comprising a support ring fitted on the input shaft and slidably supporting the armature, wherein the control retainer member further comprises a flange supporting the first bars, and wherein the input shaft is formed with a slide guide surface slidably supporting a radially inner surface of the flange.

7. The rotation transmission device of claim 6, wherein the support ring is made of a non-magnetic material.

* * * * *